Figure 1:
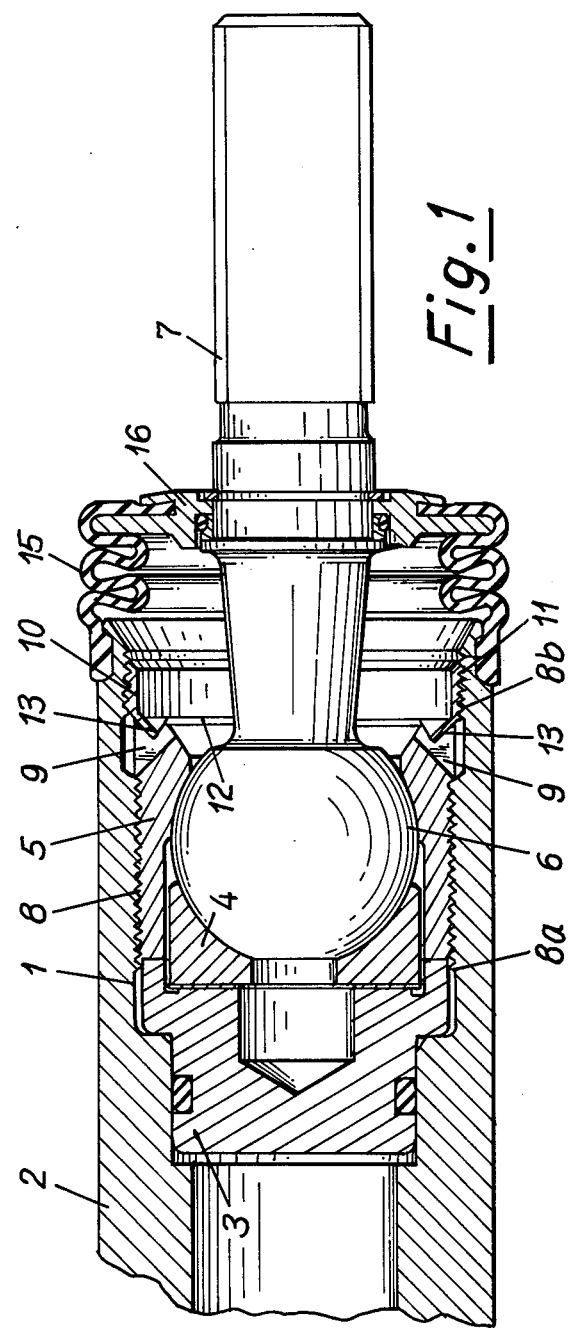

United States Patent [19]

Millard

[11] 4,120,597
[45] Oct. 17, 1978

[54] BALL JOINT

[75] Inventor: Barry John Millard, Reading, England

[73] Assignee: Adwest Engineering Limited, Great Britain

[21] Appl. No.: 772,903

[22] Filed: Feb. 28, 1977

[30] Foreign Application Priority Data

Mar. 2, 1976 [GB] United Kingdom ............... 8327/76

[51] Int. Cl.² ............................................. F16C 11/06
[52] U.S. Cl. ...................................... 403/24; 403/138;
403/320; 180/148; 29/149.5 B
[58] Field of Search ............... 403/135, 138, 140, 134,
403/137, 320, 24; 180/148; 151/17, 18, 27, 28;
29/149.5 B, 505, 512

[56] References Cited

U.S. PATENT DOCUMENTS

| 1,151,275 | 8/1915 | Kessler | 151/17 |
| 1,525,979 | 2/1925 | Broughton | 151/27 |
| 2,954,993 | 10/1960 | Scheublein | 403/134 |
| 3,814,202 | 6/1974 | Rushton | 180/148 X |
| 3,871,469 | 3/1975 | Millard | 180/148 |

Primary Examiner—Andrew V. Kundrat
Attorney, Agent, or Firm—Charles W. Helzer

[57] ABSTRACT

A ball and socket joint comprising a ball housing threaded into the socket using a screw-thread of one hand and an annular locking member threaded into the socket and into engagement with the ball housing using a screw-thread of the opposite hand, the annular locking member having an inwardly directed portion at least a part of which is deformed axially into at least one recess in the ball housing to prevent relative rotation between the locking member and the ball housing.

25 Claims, 5 Drawing Figures

BALL JOINT

This invention relates to ball and socket joints.

In some ball and socket joints difficulties are encountered in locking the ball, and usually also a ball housing, in the socket. Thus, for example, in power-assisted rack-and-pinion steering mechanisms comprising double-acting piston-and-cylinder means, it is usual to connect that end of each piston rod remote from its associated piston to a steering linkage by means of a ball and socket joint, the socket being formed in said end portion of the piston rod. Since the socket is formed in said end portion of the piston rod and since it is necessary to provide a joint of suitable size, the socket is inevitably of relatively thin wall section. The usual methods of locking the ball and ball housing in the socket have been by way of a nut having a fused polyamide patch thereon, a nut secured by a suitable adhesive (usually an anaerobic adhesive) or a nut secured by means of a circlip either with or without the interposition of suitable shims or washers. The disadvantages of using a nut having a fused polyamide patch thereon are the unreliability of the bond between the nut and the patch, and the fact that the patches when fused on the nuts tend to vary considerably in size and so make it extremely difficult to obtain consistent torque when the nuts are screwed into place, with the result that in many cases distortion of either the nut itself or of the relatively thin-walled socket will occur. Adhesives have the disadvantages that under production conditions it is difficult to ensure full coverage of the surfaces to be adhered, that the amount of adhesive used is dependant upon the person applying it, that it is difficult to keep components clean, that inconsistent torque values are obtained, that most anaerobic adhesives are adversely affected by lubricating oils, and that, in the event of servicing, parts have to be cleaned of adhesive. The use of circlips has the disadvantage that bevel type circlips cannot be used because of the limited space available and that plain wire or rectangular section force fitted circlips are incapable on their own of taking-up manufacturing tolerances with the result that axial play can occur in the ball joint. Shims or washers can be used between the nut and the circlip to prevent any axial play occurring, but this requires a large stock of shims or washers of different thicknesses and slows down production.

Further, when a nut is used to secure the ball and ball housing in the socket, there is always the danger that, as axial play occurs in the ball and socket joint due to wear, an attempt will be made to take up this axial play by tightening the nut. This can lead to seizing-up or complete failure of the ball and socket joint, which could be dangerous in a steering mechanism.

The present invention has as its object to enable the aforesaid disadvantages to be overcome or at least mitigated.

The present invention provides a ball and socket joint comprising a ball housing threaded into the socket and an annular locking member threaded into the socket and into engagement with the ball housing, the threaded engagement of the annular locking member with the socket being of opposite hand to the threaded engagement of the ball housing with the socket and the annular locking member having an inwardly directed portion at least a part of which as been deformed axially into at least one recess in the ball housing to prevent relative rotation between the locking member and the ball housing.

Said inwardly directed portion of the annular locking member may be a radially inwardly directed flange which is locally axially deformed into one or more recesses in the ball housing.

The ball housing may have diametrically opposed slots in that end thereof which is the trailing end when the ball housing is threaded into the socket, said slots being adapted to receive a suitable tool which is used to screw and tighten the ball housing in the socket. Such slots may serve as recesses into which the said inwardly directed flange is locally deformed, as by means of a suitable punch.

The bore of the annular locking member, or at least a part thereof, may be of polygonal or other suitable non-circular cross-section and may be engageable by a suitable tool to facilitate the screwing and tightening of the locking member in the socket.

The present invention also provides a method of forming a ball and socket joint which comprises assembling a ball housing with the ball, threading the ball housing into the socket using a screw-thread of one hand, threading an annular locking member into the socket and into engagement with the ball housing using a screw-thread of the opposite hand, said ball housing having at least one recess in that portion thereof engaged by the locking member and the locking member having an inwardly directed portion, and axially deforming at least a part of said inwardly directed portion into said recess to prevent relative rotation between the locking member and the ball housing.

It will readily be appreciated that since the ball housing and locking member are threaded into the socket using threads of opposite hand and are then locked together by axially deforming at least a part of said inwardly directed portion into said recess, and that since the locking member can be tightened against the ball housing with a predetermined degree of torque, the ball housing and locking member will tend to be self-tightening one against the other and accordingly not only will the ball housing be effectively prevented from loosening and causing end play in the joint, but distortion of a thin-walled socket, such as when the socket is formed in an end portion of a piston rod as aforesaid, can be prevented. Moreover, locking of the ball housing is effected by a single readily-manufactured locking member which is easily inserted and locked in position during assembly of the ball and socket joint and which provides a ready visual indication that locking of the ball housing has been effected.

Also, because the ball housing and locking member are threaded in the socket by threads of opposite hand and are then locked together, it will not be possible to take up axial play in the ball and socket joint by tightening the locking member, thus avoiding the dangers hereinbefore referred to.

Figure 4:
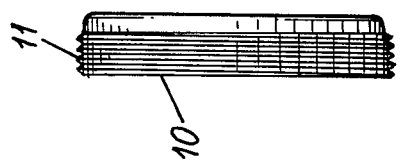
Figure 3:
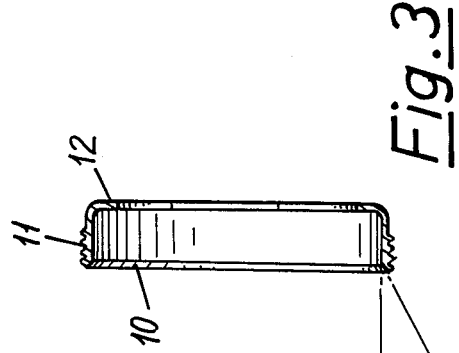
Figure 2:
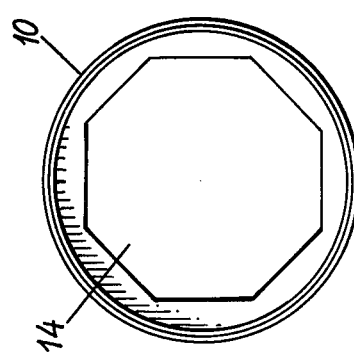
Figure 5:
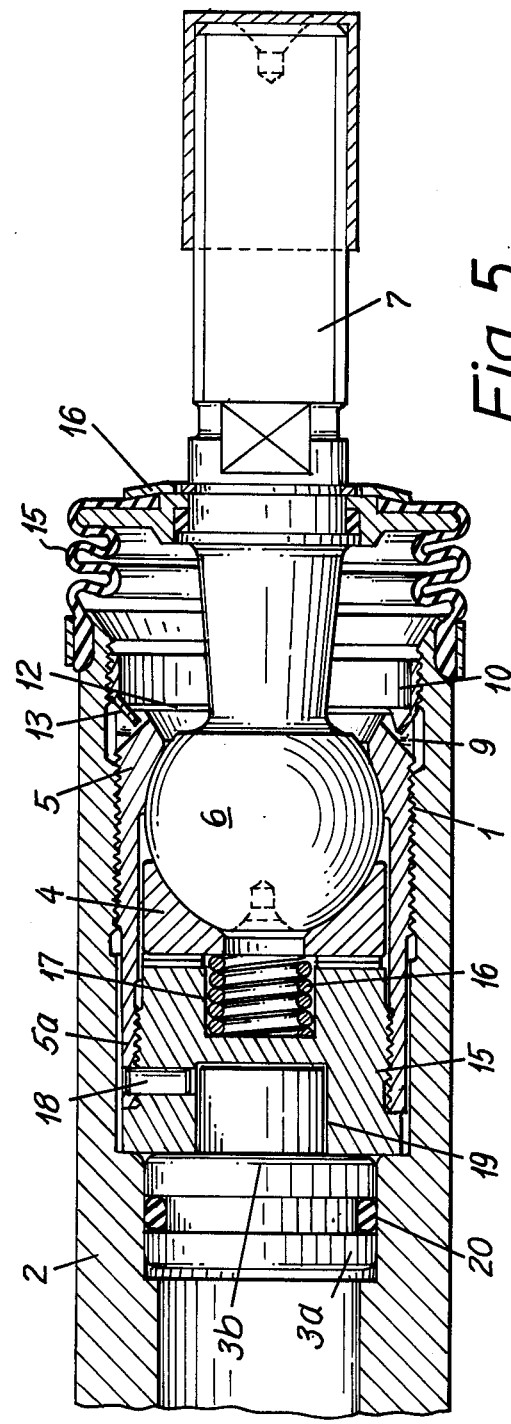

The invention will be more particularly described with reference to the accompanying drawings, in which:

FIG. 1 is a cross-sectional elevation of a ball and socket joint according to the present invention, FIGS. 2, 3 and 4 are an end, cross-sectional and side elevation respectively of a locking member used in the ball and socket joint of FIG. 1, and FIG. 5 is a cross-sectional elevation of another embodiment of ball and socket joint according to the invention.

The ball and socket joint illustrated in FIG. 1 comprises a socket 1 formed in the outer end portion of a piston rod 2, the piston rod 2 being the piston rod of a double-acting piston (not shown) of a power-assisted rack-and-pinion steering mechanism (not shown).

Mounted within the socket 1 is a liner 3 which cooperates with a bearing pad 4 and a ball housing 5 to locate and seat a ball 6 formed on one end of a steering linkage 7. The liner 3 and bearing pad 4 are loosely fitted in the socket 1 and, with the ball 6, are retained in the socket 1 by the ball housing 5 which makes screw-threaded engagement as shown at 8 with a first screw-thread 8a internally of the socket 1. The ball housing 5 has diametrically opposed slots 9 in the outer end thereof which are engaged, during assembly, by a suitable tool which is used to screw and tighten the ball housing 5 in the socket 1.

The ball housing 5 is locked in tightened position by an annular locking member 10 which is externally screw-threaded at 11 with a thread of opposite hand to the screw-thread on the ball housing 5 and which has a radially inwardly directed flange 12. The locking member 10 makes screw-threaded engagement with a second screw-thread 8b internally of the socket 1, the screw-thread 8b being of opposite hand to the screw-thread 8a and also being of larger diameter than the screw-thread 8a so that the ball housing 9 can pass freely therethrough for engagement with the screw-thread 8a. The locking member 10 is screwed into the socket 1 so that the flange 12 engages the ball housing 5 and the flange 12 is then locally axially deformed as shown at 13 in FIG. 1 into the slots 9 in the ball housing 5 to lock the ball housing 5 and locking member 10 against relative rotation. The locking member 10 is formed from a suitable deformable material, e.g., mild steel. As will be seen from FIG. 2, the bore 14 of locking member 10 is polygonal in cross-section so that it can be engaged by a suitable tool during assembly to enable it to be screwed and tightened in the socket 1.

The ball and socket joint is protected against the ingress of dirt and moisture by an elastomeric bellows member 15 which is sealingly secured on the one hand to the piston rod 2 and on the other hand to a collar 16 which is itself sealingly mounted on steering linkage 7.

In the embodiment shown in FIG. 5, in which like reference numerals have been used to indicate like parts, the ball housing 5 has an extension 5a which extends beyond the bearing pad 4 and is internally screw-threaded to receive an externally screw-threaded retaining nut 15 which retains the ball housing 5 and bearing pad 4 assembled with the ball 6. A spring 16 housed in a recess 17 in the nut 15 is provided for urging the bearing pad 4 into engagement with the ball 6. The retaining nut 15 and ball housing 5 are locked together in assembled relationship in any suitable manner as by means of a dowel pin 18 inserted in aligned bores in the ball housing 5 and retaining nut 15. The liner 3 of the FIG. 1 embodiment is replaced by a plug 3a having a spigot 3b which engages in a recess 19 in the retaining nut 15. An annular sealing ring 20 is inserted in an annular groove in the plug 3a.

The arrangement of the FIG. 5 embodiment enables the ball housing 5, bearing pad 4, spring 16 and nut 15 to be pre-assembled with the ball 6 and steering linkage 7 as a complete package which can simply be screwed into the socket 1 and locked in place by means of the annular locking member 10. This not only facilitates production but also facilitates later maintenance of a steering mechanism to which the joint is fitted since the said complete package can readily be removed from the socket 1 and replaced by a new pre-assembled package in the event of undue wear in the ball and socket joint.

What is claimed is:

1. A ball and socket joint comprising:
   (a) a socket for receiving a ball;
   (b) a first screw thread formed in a circumferential wall of the socket;
   (c) a ball housing secured in said socket in threaded engagement with said first screw thread for retaining a ball in the socket;
   (d) a second screw thread formed in the circumferential wall of the docket at a location outwardly from said first screw thread toward the mouth of the socket; the second screw thread being of opposite hand to said first screw thread and being of larger diameter than said first screw thread so that the ball housing can pass therethrough into threaded engagement with said first screw thread;
   (e) an annular locking member secured to said socket in threaded engagement with said second screw thread and in retaining abutting relationship with said ball housing;
   (f) at least one recess in the ball housing abutted by said annular locking member; and
   (g) a radially inwardly directed portion formed on said annular locking member which is deformed axially into said at least one recess in the ball housing to prevent relative rotation between the locking member and the ball housing.

2. A ball and socket joint according to claim 1 wherein said first and second screw threads are formed on respective internal surfaces of the circumferential wall of the socket with the second screw thread being formed on a portion of the socket having a larger internal diameter than the portion on which the first screw thread is formed.

3. A ball and socket joint according to claim 2, wherein said inwardly directed portion of the locking member comprises a radially inwardly directed flange which is locally deformed into said at least one recess in the ball housing.

4. A ball and socket joint according to claim 2 wherein said ball housing has diametrically opposed slots in that end thereof which is the trailing end when the ball housing is threaded into the socket.

5. A ball and socket joint according to claim 4, wherein said inwardly directed portion of the locking member is locally deformed into said slots.

6. A ball and socket joint according to claim 1, wherein at least a part of the bore of the annular locking member is of polygonal cross-section so as to be engageable by a suitable tool to facilitate the screwing and tightening of the locking member in the socket.

7. A ball and socket joint according to claim 2, wherein a bearing pad is provided which cooperates with the ball housing to seat the ball of the ball and socket joint.

8. A ball and socket joint according to claim 7, wherein a liner is provided in the bottom of the socket of the ball and socket joint, said liner cooperating with the bearing pad and ball housing to locate and seat the said ball.

9. A ball and socket joint according to claim 8, wherein the bearing pad is received partly in a recess in said liner and partly in one end of the ball housing.

10. A ball and socket joint according to claim 7, wherein said bearing pad is mounted in one end of the ball housing and is retained therein by a retaining nut which makes screw-threaded engagement with the ball housing.

11. A ball and socket joint according to claim 8, wherein a spring is interposed between said retaining nut and the bearing pad for urging the bearing pad into engagement with said ball.

12. A ball and socket joint according to claim 8, wherein means is provided for locking said retaining nut and ball housing in screw-threaded engagement.

13. A ball and socket joint according to claim 12, wherein said locking means comprises a dowel pin inserted into aligned bores in the ball housing and retaining nut.

14. A ball and socket joint according to claim 3, wherein the bearing pad, ball housing and retaining nut form with the ball a pre-assembled package.

15. A ball and socket joint according claim 2, wherein the socket is formed in one end of a piston rod of a power-assisted rack-and-pinion steering mechanism comprising double-acting piston-and-cylinder means.

16. A method of forming a ball and socket joint which comprises a first screw thread formed in a circumferential wall of the socket and a second screw thread of opposite hand to said first screw thread formed in the circumferential wall of the socket at a location outwardly from said first screw thread toward the mouth of the socket and being of larger diameter than said first screw thread, said method comprising assembling a threaded ball housing with the ball, threading the ball housing into the socket using the first screw-thread, threading an annular locking member into the socket and into engagement with the ball housing using the second screw-thread of the opposite hand, said ball housing having at least one recess in that portion thereof engaged by the locking member and the locking member having an inwardly directed portion deformed into said recess to prevent relative rotation between the locking member and the ball housing.

17. A method according to claim 16, which comprises providing the annular locking member with a radially inwardly directed flange and locally deforming said flange into said at least one recess in the ball housing.

18. A method according to claim 17, which comprises providing diametrically opposed slots in that end of the ball housing which is the trailing end when the ball housing is threaded into the socket and engaging a tool with said slots in order to thread the ball housing into the socket.

19. A method according to claim 18, which comprises locally axially deforming said inwardly directed portion of the annular locking member into said slots to prevent relative rotation between the locking member and the ball housing.

20. A method according to claim 16, which comprises providing a bearing pad which cooperates with the ball housing to seat the ball of the ball and socket joint.

21. A method according to claim 20, which comprises providing a liner in the bottom of the socket which cooperates with the bearing pad and ball housing to seat and locate said ball.

22. A method according to claim 20, which comprises mounting the bearing pad in one end of the ball housing and retaining it therein by means of a retaining nut which makes screw-threaded engagement with the ball housing.

23. A method according to claim 22, which comprises assembling with the ball said ball housing, bearing pad and retaining nut so as to form a pre-assembled package which can be screwed into said socket.

24. A method according to claim 22, which comprises interposing a spring between said bearing pad and said retaining nut so that the spring acts to urge the bearing pad into engagement with the ball.

25. A method according to claim 16, which comprises forming said socket in one end of a piston rod of a power-assisted rack-and-pinion steering mechanism comprising double-acting piston-and-cylinder means.

* * * * *